United States Patent
Defontaine

(10) Patent No.: US 6,450,372 B1
(45) Date of Patent: Sep. 17, 2002

(54) ROTARY POWDER DISPENSER

(75) Inventor: Bernard Defontaine, Maurepas (FR)

(73) Assignee: Compagnie Generale des Matieres Nucleaires, Velizy-Villacoublay (FR)

(*) Notice: Subject to any disclaimer, the term of this patent is extended or adjusted under 35 U.S.C. 154(b) by 0 days.

(21) Appl. No.: 09/787,682

(22) PCT Filed: Jul. 21, 2000

(86) PCT No.: PCT/FR00/02104
§ 371 (c)(1),
(2), (4) Date: Jun. 4, 2001

(87) PCT Pub. No.: WO01/07347
PCT Pub. Date: Feb. 1, 2001

(30) Foreign Application Priority Data

Jul. 23, 1999 (FR) .............................. 99 09581

(51) Int. Cl.⁷ ................................................ G01F 11/10
(52) U.S. Cl. ...................................... 222/370; 222/196
(58) Field of Search ................................ 222/370, 486, 222/556, 548, 185.1, 196, 197, 161, 168

(56) References Cited

U.S. PATENT DOCUMENTS

| | | | | |
|---|---|---|---|---|
| 2,605,020 A | * | 7/1952 | Sarlls | 222/129 |
| 2,825,604 A | | 4/1958 | Sbestyen | 302/28 |
| 2,924,358 A | * | 2/1960 | Packwood, Jr. et al. | 222/239 |
| 3,013,698 A | * | 12/1961 | Gordon et al. | 222/158 |
| 4,613,058 A | * | 9/1986 | Conger | 222/36 |
| 4,646,943 A | * | 3/1987 | Hafner | 222/148 |
| 4,787,535 A | * | 11/1988 | Angly | 222/148 |
| 4,893,737 A | * | 1/1990 | Borjesson | 222/360 |
| 5,106,239 A | * | 4/1992 | Krebsbach | 406/63 |
| 5,775,532 A | * | 7/1998 | Bullivant | 222/1 |
| 5,984,150 A | * | 11/1999 | Scott | 222/370 |

FOREIGN PATENT DOCUMENTS

| | | | | |
|---|---|---|---|---|
| DE | 1 756 198 | 4/1970 | | B65G/81/75 |
| DE | 41 16 465 | 11/1992 | | B65G/53/56 |
| DE | 197 02 215 | 7/1998 | | B65G/53/56 |
| FR | 1.507.545 | 1/1967 | | |
| GB | 1 435 230 | 5/1976 | | F16K/3/04 |

* cited by examiner

Primary Examiner—Henry C. Yuen
Assistant Examiner—Frederick Nicolas
(74) Attorney, Agent, or Firm—Cohen, Pontani, Lieberman & Pavane

(57) ABSTRACT

A rotary powder dispenser disposed between a top inlet pipe and at least two bottom outlet pipes includes a casing (1) connected at its top to an inlet via which the flow of powder is taken in, and at its bottom to outlets via which the flow is delivered, the casing (1) being formed of a shell (2) and of a removable base (3); a rotary plug (8) that is disposed in the casing, that is of generally cylindrical shape, and that can turn about its own axis, the plug being provided with an internal duct (11) that slopes relative to its axis so as to enable the powder to flow through it under gravity, with a ring of gear teeth (12) that co-operates with a worm screw (12a) to rotate said plug, and with a cam (13) that co-operates with at least one pusher (14, 15) external to the plug to determine the exact position of the plug; and at least one sealing system (9, 10) disposed between the plug (8) and the casing (1).

6 Claims, 4 Drawing Sheets

ROTARY POWDER DISPENSER

In certain industries, it is necessary to handle powders that can be harmful and/or corrosive. Such handling often involves enabling a flow of such powder to be directed successively from one tube into a plurality of different tubes, for example for the purpose of packaging it. It is therefore necessary for a dispenser that is capable of directing the flow of powder appropriately to be disposed between the powder inlet tube and the powder outlet tubes.

Such a dispenser must often offer various advantageous properties. It must be sufficiently leaktight to avoid any leakage of powder, in particular in order to guarantee that the powder remains confined. It must also preferably be self-cleaning at the contact interfaces between its moving parts so as to avoid any premature wear on said surfaces due to the generally abrasive nature of the powder that is handled.

The dispenser of the present invention is a rotary powder dispenser between a top inlet pipe and at least two bottom outlet pipes, and it aims to satisfy all of these conditions.

Said dispenser is characterized in that it comprises:

a casing connected at its top to a powder inlet via which the flow of powder is taken in, and at its bottom to powder outlets via which said flow is delivered, said casing being formed of a bell-shaped shell whose bottom is fixed to a removable base;

a rotary plug that is disposed in said casing, that is of generally cylindrical shape, and that can turn about its own axis, the inside of said plug being provided with a duct which slopes relative to its axis and through which the powder flows under gravity, said plug being provided at its periphery with a ring of gear teeth that co-operate with a worm screw to rotate said plug, and with a cam that co-operates with at least one pusher external to said plug to determine the exact position of the plug; and at least one and preferably two sealing system(s) disposed between a fixed surface of said casing and the moving surface of said plug to provide tightness between them.

Preferably, the rotary dispenser of the invention further comprises:

at least one wiper device acting, while said plug is rotating, to remove any powder that has built up in the empty spaces between the plug and the casing; and at least one vibrator acting on the outside face of the casing to make it easier for the powder to flow.

The invention will be better understood on referring to the following description of an embodiment of the invention given by way of non-limiting example. In this description, certain secondary characteristics of the invention are specified.

Figure 1:
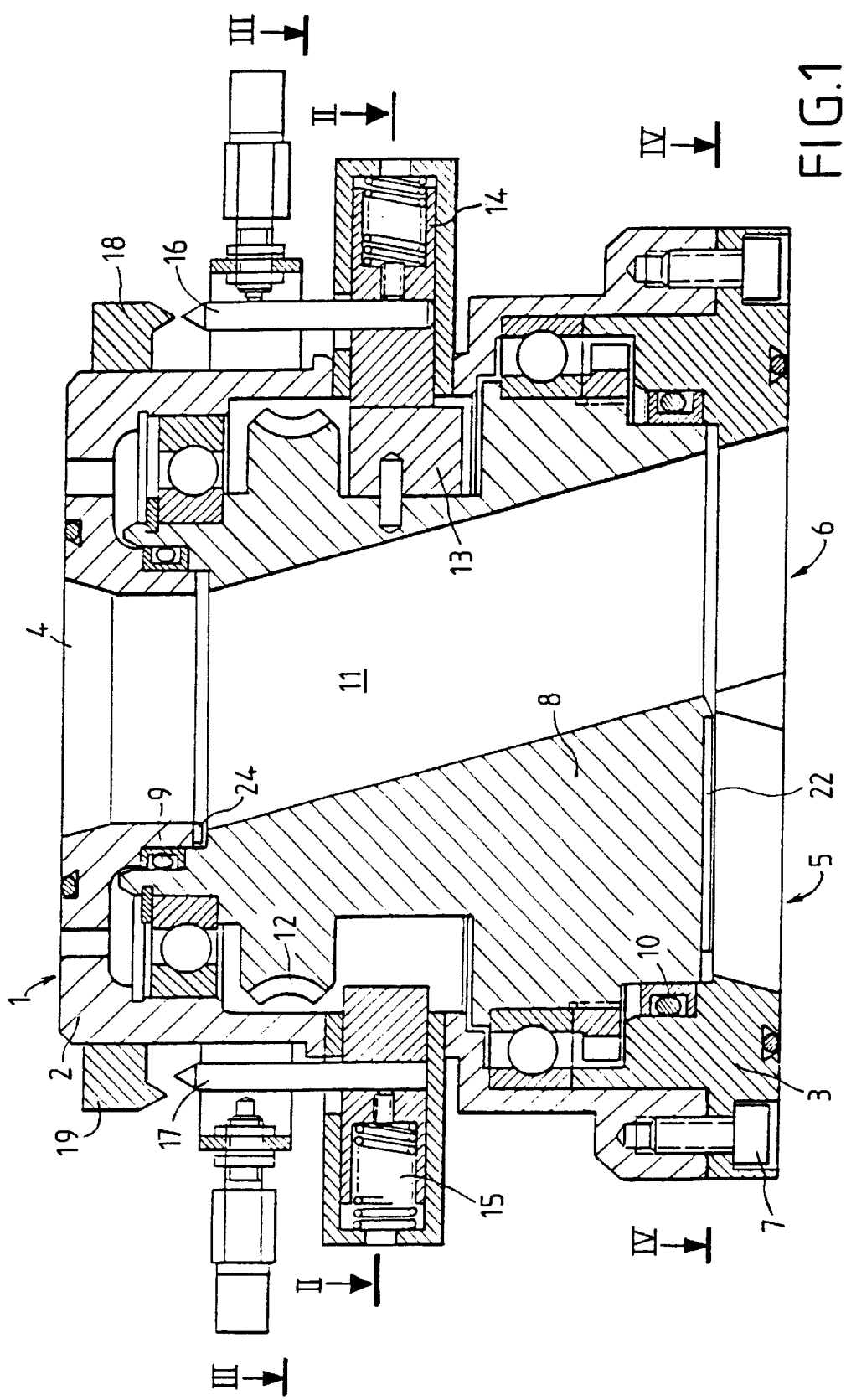
FIG. 1 is a longitudinal section view of the rotary dispenser of the invention, on its axis.
Figure 2:
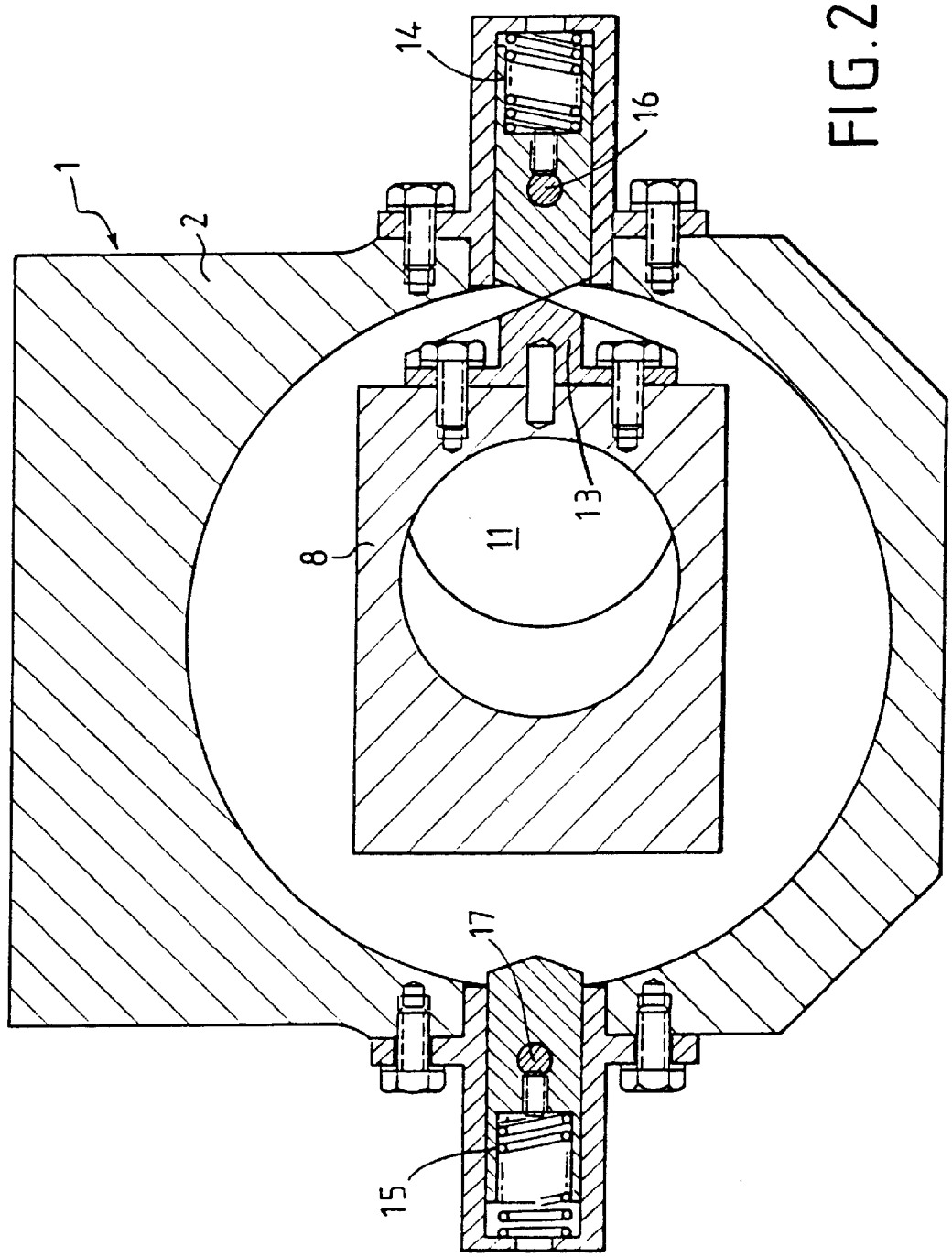
FIG. 2 is a section view on II—II of FIG. 1.

At 1, FIGS. 1 and 2 show a casing which is generally cylindrical in shape and which is made up of a generally bell-shaped shell and of a removable base 3. The shell 2 of said casing is provided with an opening 4 which is connected in leaktight manner to the powder inlet tube, and said base 3 is provided with two openings 5 and 6 which are connected (in leaktight manner) to respective ones of two tubes via which said powder is delivered successively. Said base 3 is fixed securely to said shell by means of screws such as 7.

At 8, FIGS. 1 and 2 show a rotary plug mounted to rotate about its own axis by means of ball bearings. This plug is generally cylindrical in shape and is mounted in leaktight manner in the casing by means of two gaskets, e.g. combined rubber-and-Teflon gaskets, one of the gaskets 9 being situated at the top of said plug 8, between said plug 8 and the central portion of the top of said shell 2, the other gasket 10 being situated at the bottom of said plug, between said plug 8 and the base 3 of the casing 1.

The inside of the plug 8 is provided with a sloping cylindrical duct 11 through which the powder flows. This duct 11 has a top diameter that is substantially equal to the diameter of the opening 4 in the casing, and has a bottom diameter that is substantially equal to the diameter of each of the openings 5 and 6 in the base of the casing. Very generally, the diameter of the openings 4, 5, and 6 are the same. The gaskets 9 and 10 ensure that the powder is confined to the rotary dispenser of the present invention. The path followed by the powder is limited to entering via the opening 4, to flowing through the duct 11, and to exiting via at least one of the openings 5 and 6. In this way, all of the mechanical components of the powder dispenser are isolated, thereby enabling such a dispenser to be used for radioactive powder, provided that it is also confined both upstream and downstream from the dispenser of the present invention.

To this end, in order to reinforce the action of the gaskets 9 and 10, dynamic confinement is implemented by suction achieved by means of a pressure lower than the pressure of the surroundings being maintained in all of the equipment situated upstream and downstream from the powder dispenser and in the above-mentioned duct 11.

Figure 3:
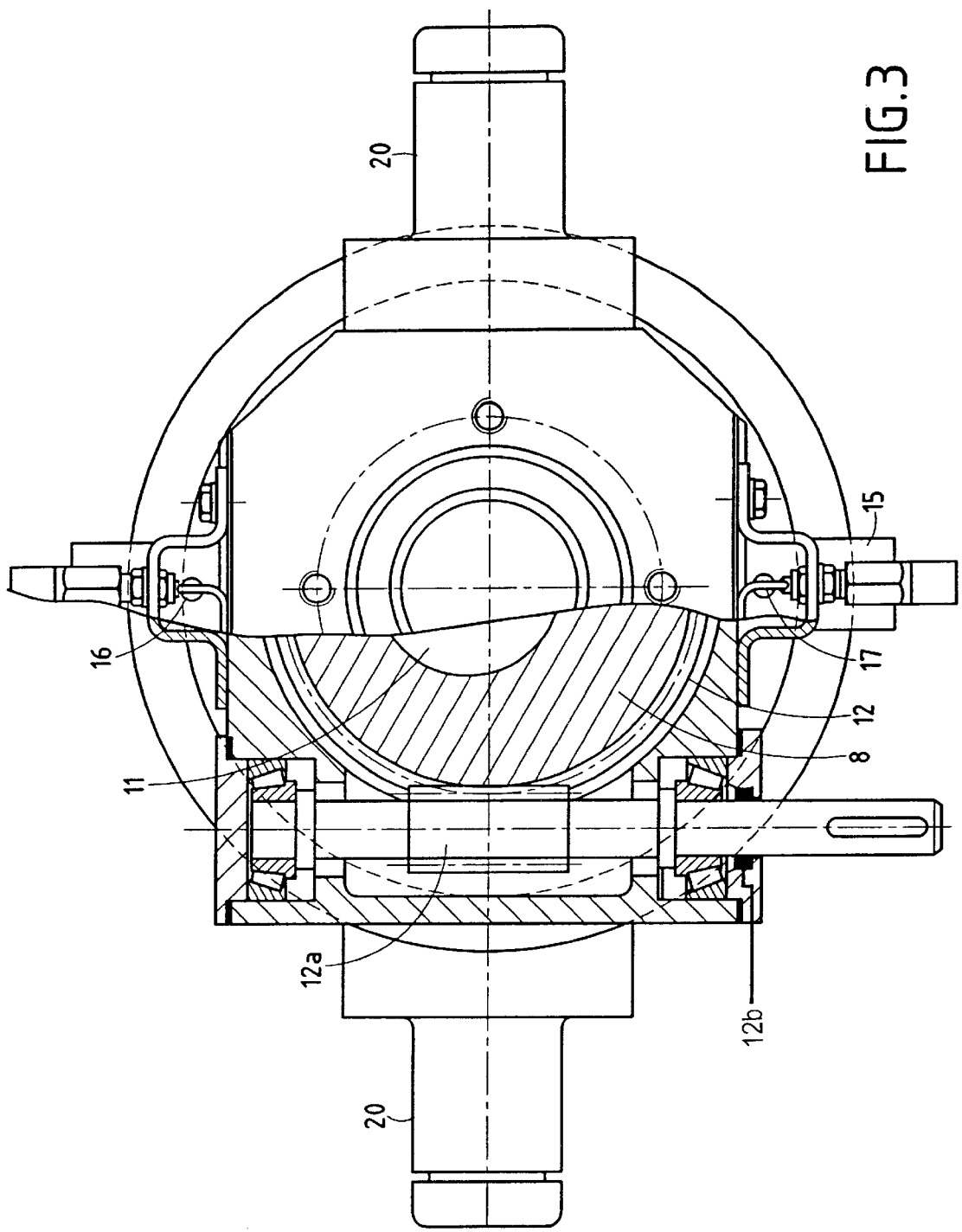
FIG. 3 is a view partially in section on III—III of FIG. 1.
Figure 4:
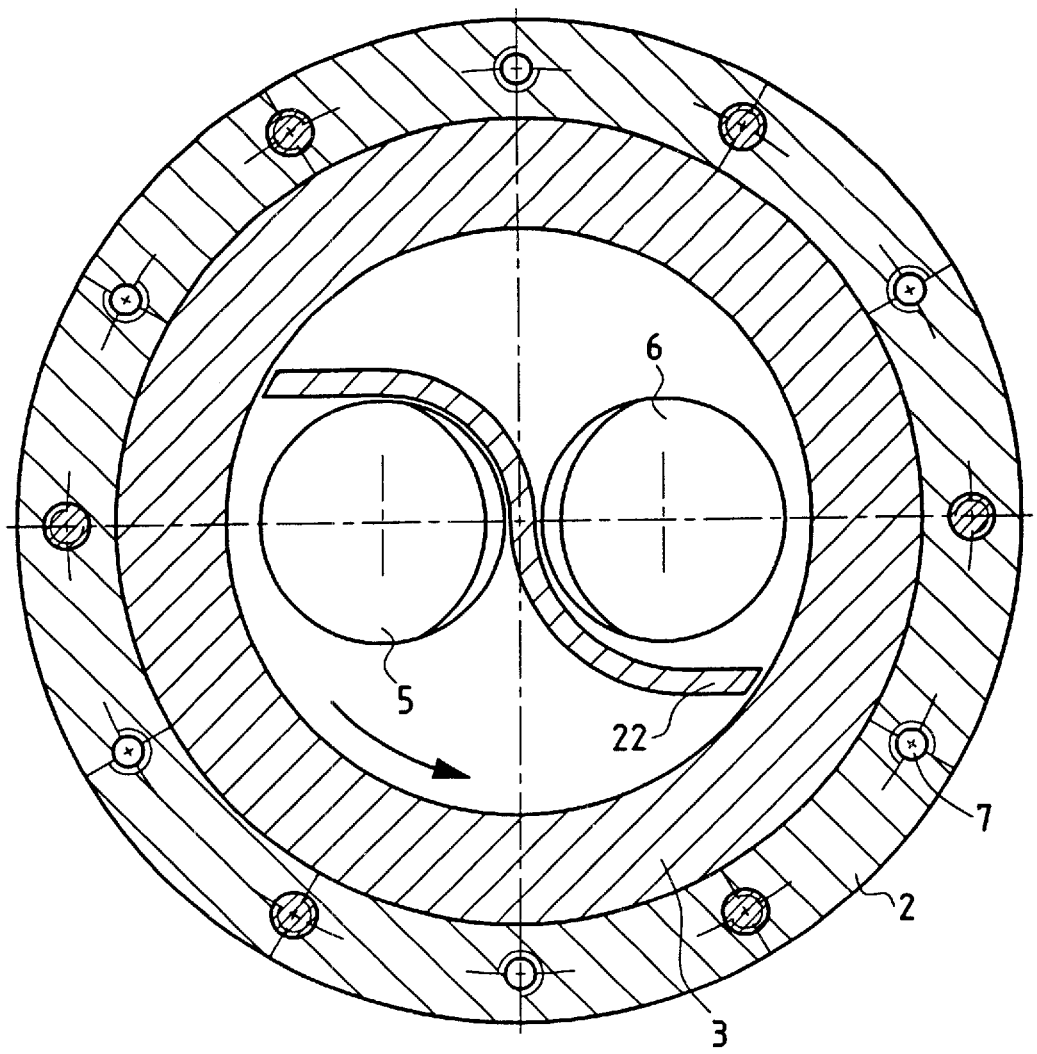
FIG. 4 is a section view on IV—IV of FIG. 1.

Around its periphery, eg. in its lop portion, said plug 8 is provided with a ring of gear teeth 12 which co-operates with a worm screw 12a driven, e.g., by a motor 12b (see FIG. 3) to enable said plug to be turned about its own axis.

At 13, FIGS. 1 and 2 show a cam fixed to the plug. By means of the plug 8 being rotated, said cam comes to move one of two pushers 14 and 15 fixed to the casing. These pushers may be secured to respective pointers 16, 17 emerging from said casing and enabling an observer to check, from outside the casing, the exact position of the plug 8 relative to a fixed mark 18 and 19.

In addition, the device of the invention preferably includes at least one vibrator 20 (FIG. 3) mounted on the external face of the casing 1 and serving to make it easier for the powder to flow through the internal duct 11 in the plug 8.

According to another advantageous characteristic of the invention (see FIGS. 1 to 4), the bottom face of the plug 8 is provided with an S-shaped wiper 22 serving to wipe away any powder that builds up between the base 3 of the casing 1 and the bottom face of said plug 8. Similarly, it is advantageous for the top face of the plug to be provided with a ring of wiper teeth 24 around its periphery, making it possible to return to the duct 11 any powder that builds up between the top face of the plug 8 and the casing 1.

It should be noted that the plug 8 always rotates in the same direction, thereby making it possible for said S-shaped wiper 22 and said wiper teeth 24 to be directed appropriately. In this way, localized deposition of powder is avoided by means of continuous self-cleaning of the plug-casing interfaces.

To give an order of magnitude, the position of the plug may be changed about once per day, and the changeover may take about one minute.

What is claimed is:

1. A rotary powder dispenser disposable between a top inlet pipe and at least two bottom outlet pipes, said dispenser comprising:

a casing having a top and a bottom, and being adapted to connect at said top to a powder inlet through which a flow of powder is received, and also adapted to connect at said bottom to at least one powder outlet through which said flow is delivered, said casing having an outside face and including a shell and a removable base;

a rotary plug disposed in said casing, said plug having a generally cylindrical shape defining an axis, said plug having a bottom face and an upper face, and being rotatable about said axis, said plug further including an internal duct that slopes relative to said axis for allowing said powder to flow therethrough under gravity, said rotary plug also having a ring of gear teeth and a cam;

a worm screw adapted to engage with said ring of gear teeth to rotate said plug;

at least one pusher external to said plug adapted to engage with said cam and having, indicia thereon corresponding to the rotational position of said plug, whereby the exact rotational position of said plain may be determined by external observation of said indicia; and at least one sealing system disposed between said plug and said casing to prevent leakage of said powder from said casing.

2. A dispenser according to claim 1, further comprising at least one wiper device for removing, while said plug is rotating, any powder that may build up in empty spaces defined between said plug and said casing.

3. A dispenser according to claim 2, wherein said wiper device comprises a wiper disposed on said bottom face of said plug for wiping away any powder disposed between said base of said casing and said bottom face of said plug.

4. A dispenser according to claim 2, wherein said wiper device comprises a ring of wiper teeth disposed around the periphery of said top face of said plug in order to return to said duct any powder situated between said top face of said plug and said casing.

5. A dispenser according to claim 1, further comprising at least one vibrator acting on said outside face of said casing to facilitate said flow of said powder.

6. A dispenser according to claim 3, wherein said wiper device comprises a ring of wiper teeth disposed around the periphery of said top face of said plug in order to return to said duct any powder situated between said top face of said plug and said casing.

* * * * *